April 6, 1943. E. C. WIEGMANN ET AL 2,315,682
MEASURING INSTRUMENT
Filed Dec. 2, 1938 7 Sheets-Sheet 1

*INVENTOR.*
WALTER G. TRUMBOWER
COLEMAN B. MOORE
EDWIN C. WIEGMANN
BY George M. Trumbower
*ATTORNEY.*

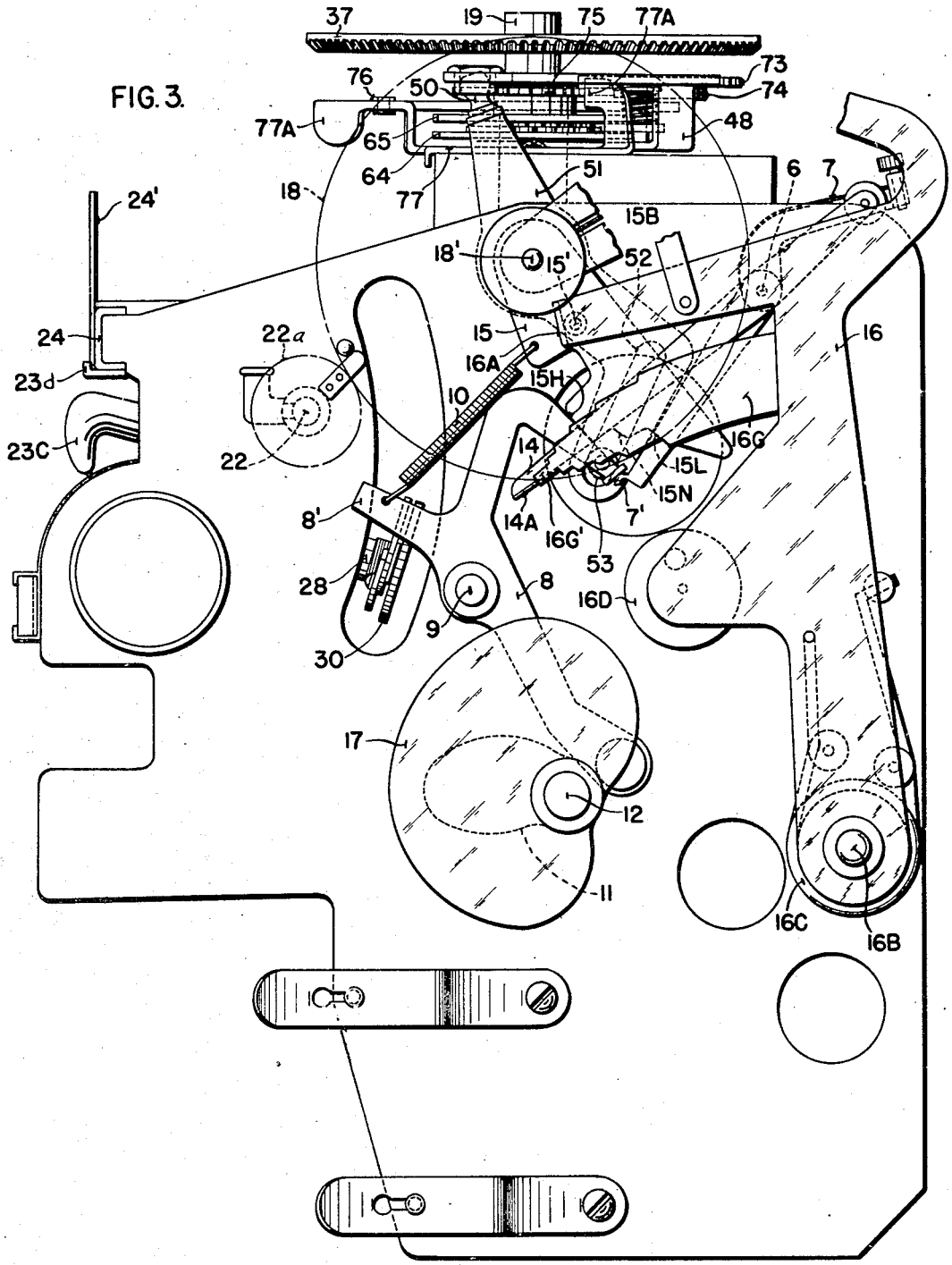

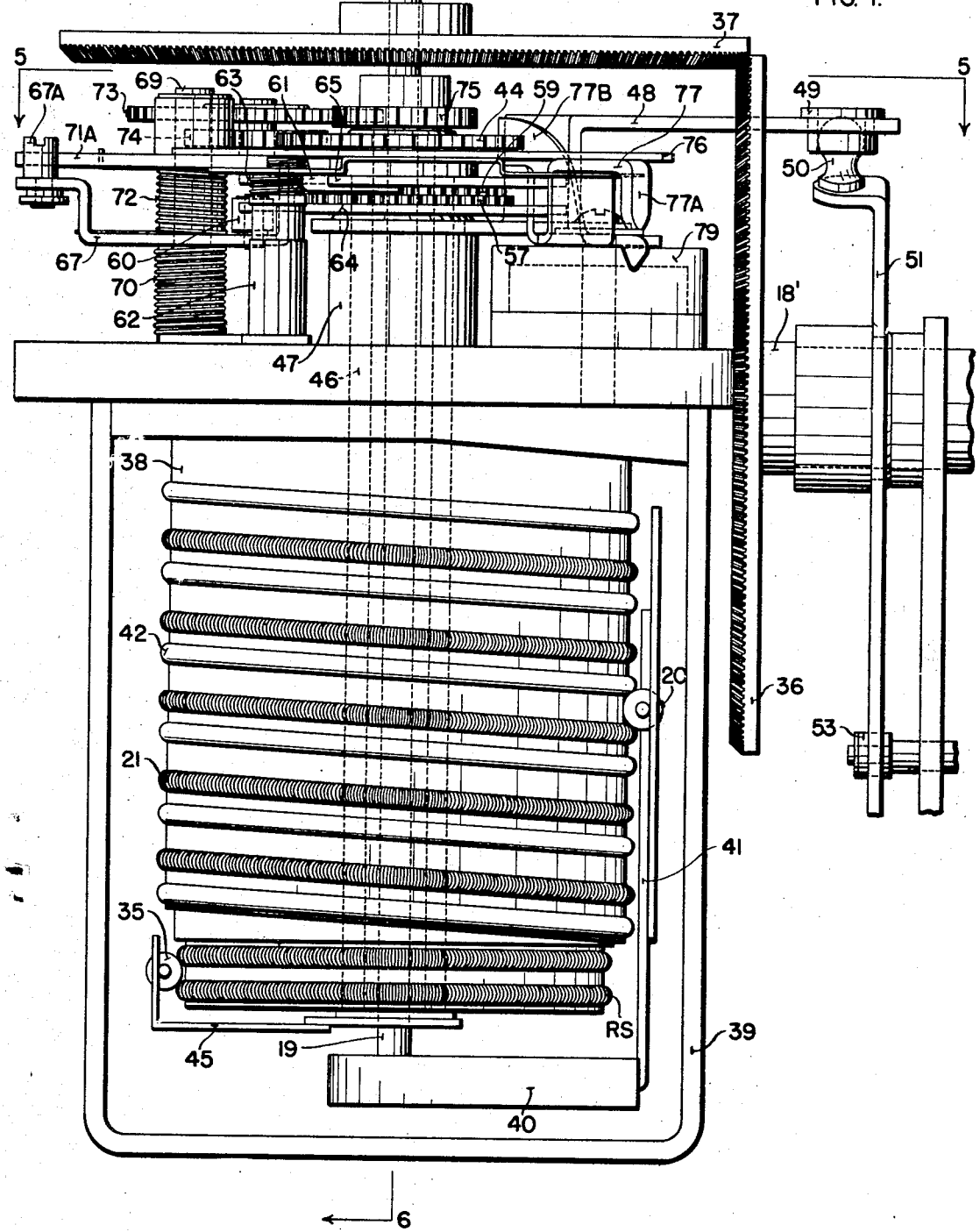

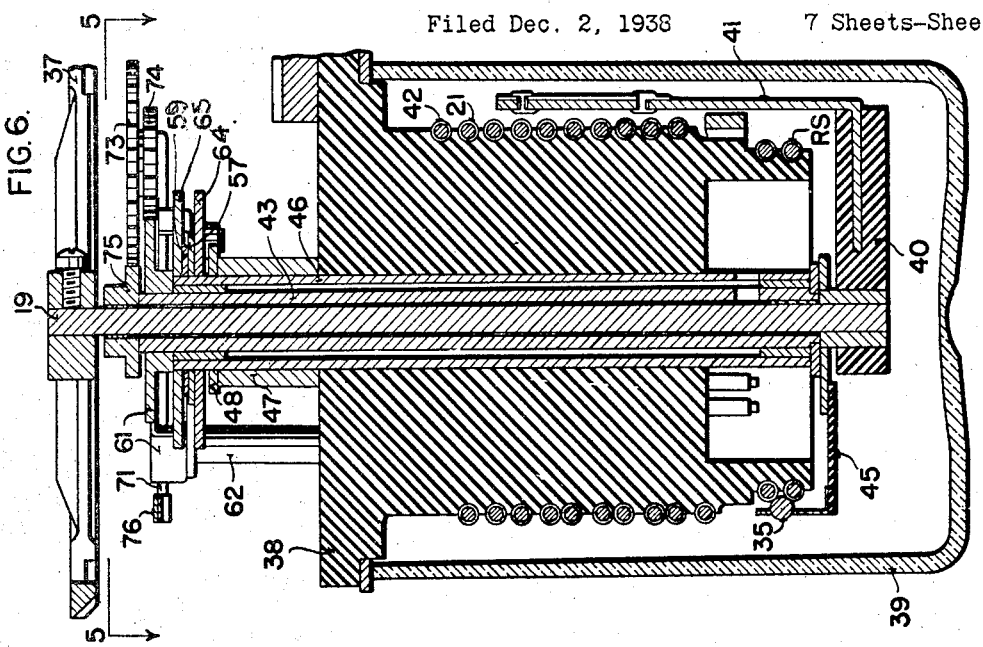
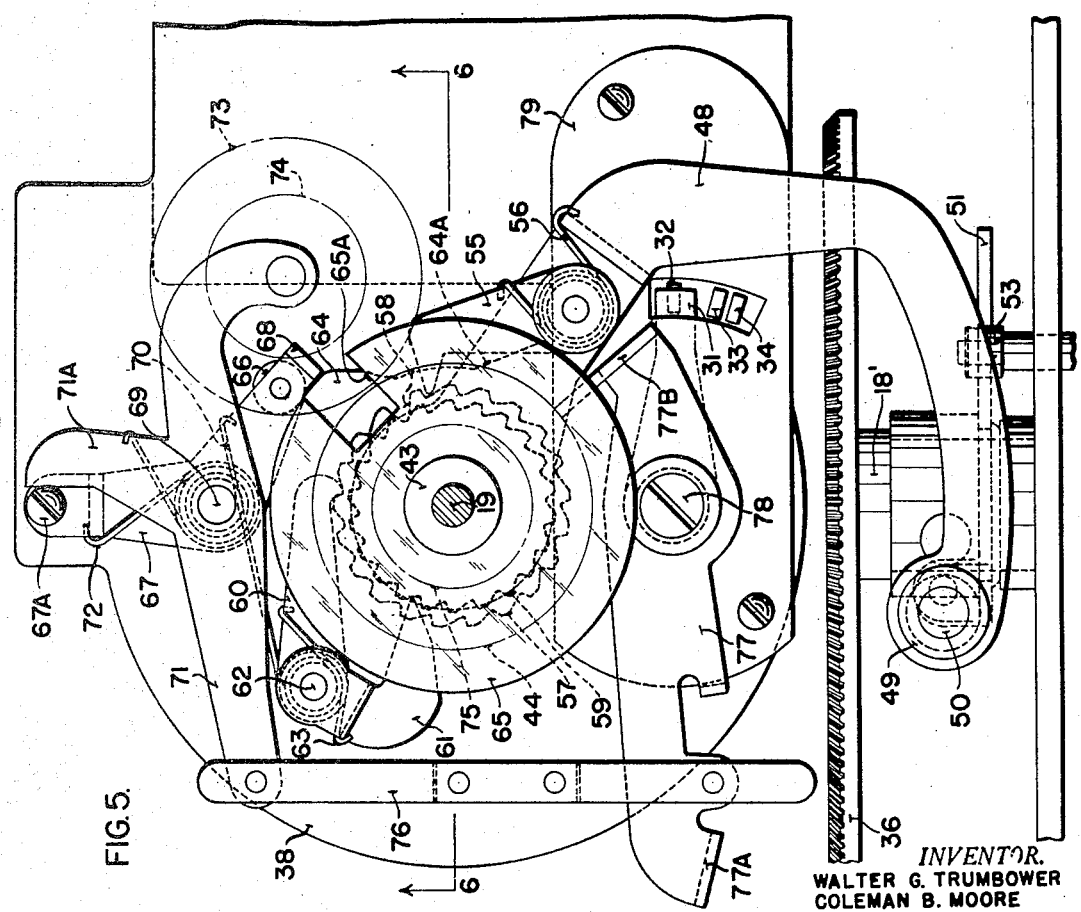

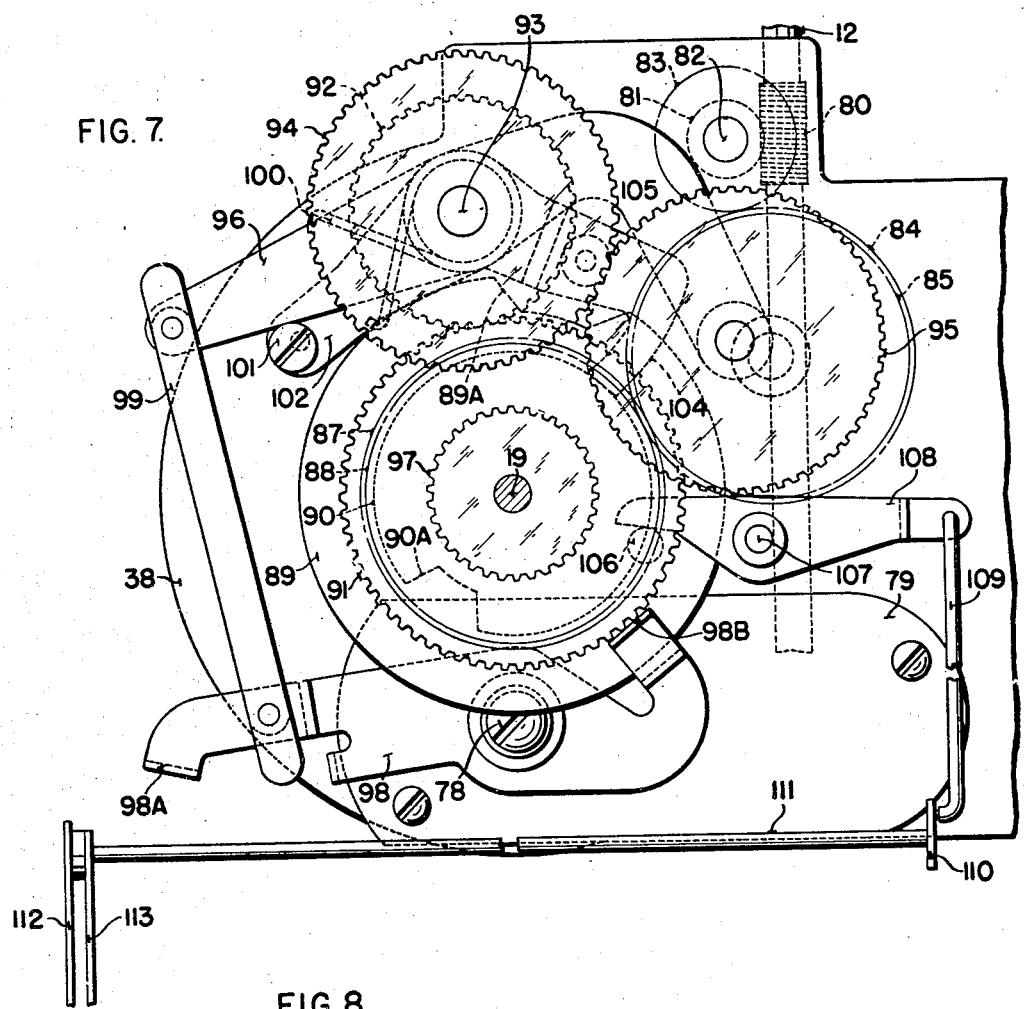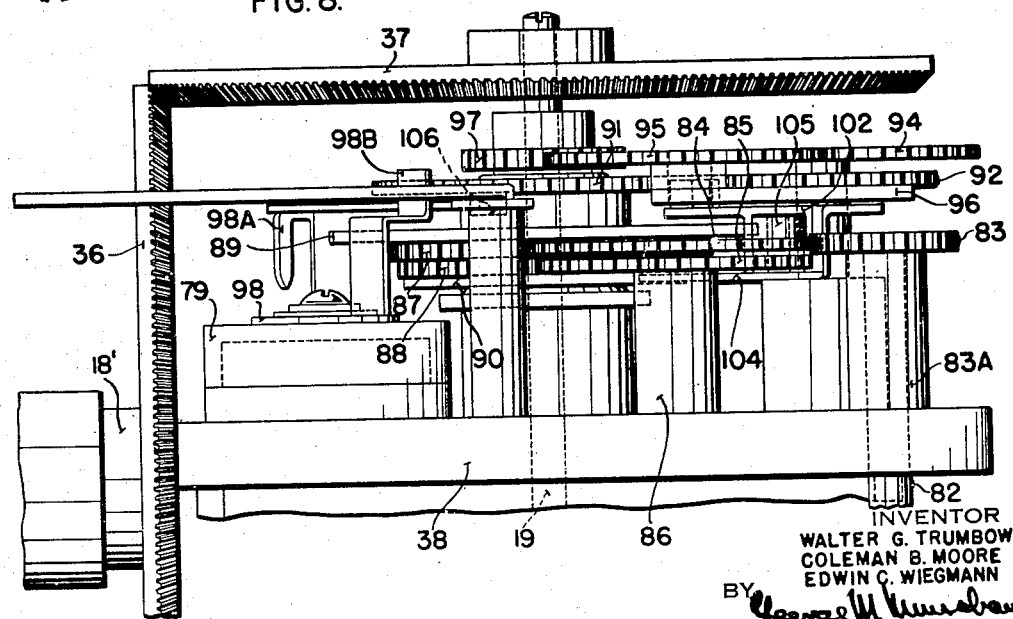

April 6, 1943.    E. C. WIEGMANN ET AL    2,315,682
MEASURING INSTRUMENT
Filed Dec. 2, 1938    7 Sheets-Sheet 6
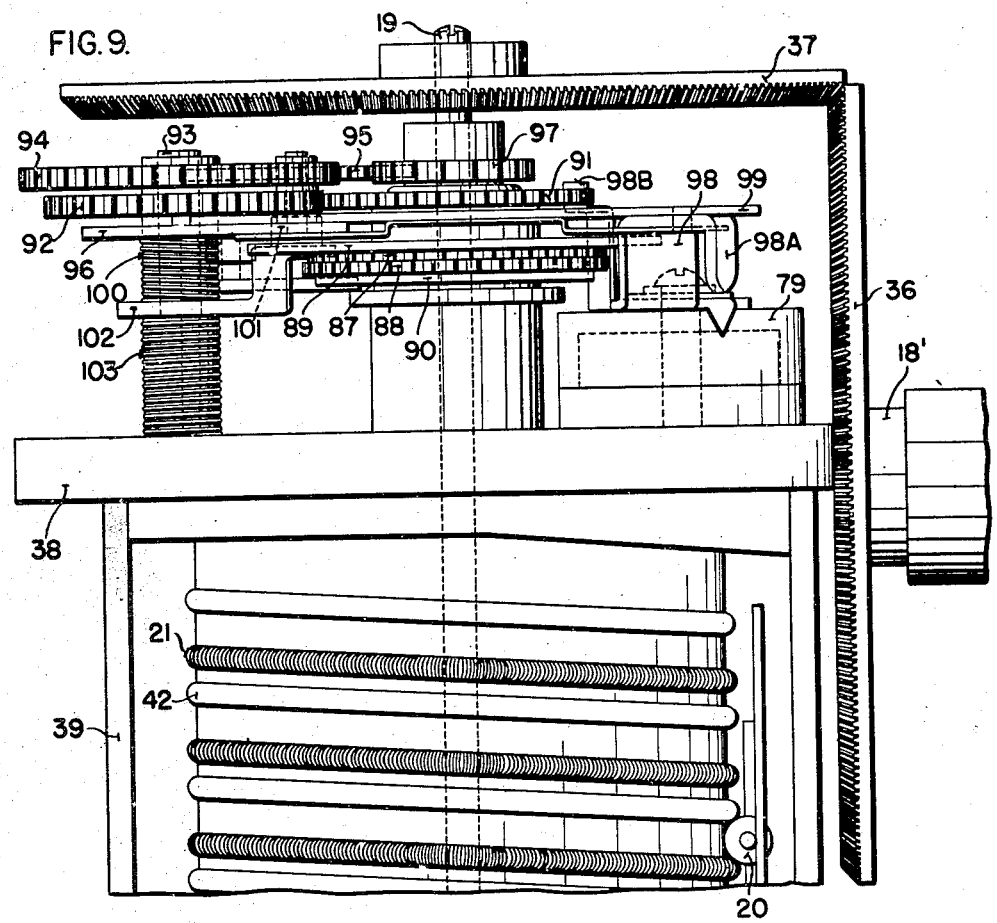
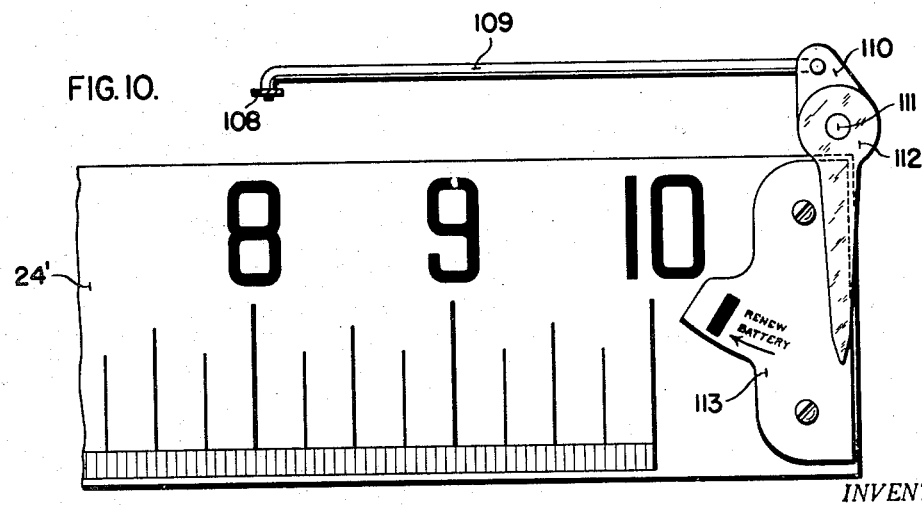
INVENTOR.
WALTER G. TRUMBOWER
COLEMAN B. MOORE
EDWIN C. WIEGMANN
BY George N. Mumbaugh
ATTORNEY

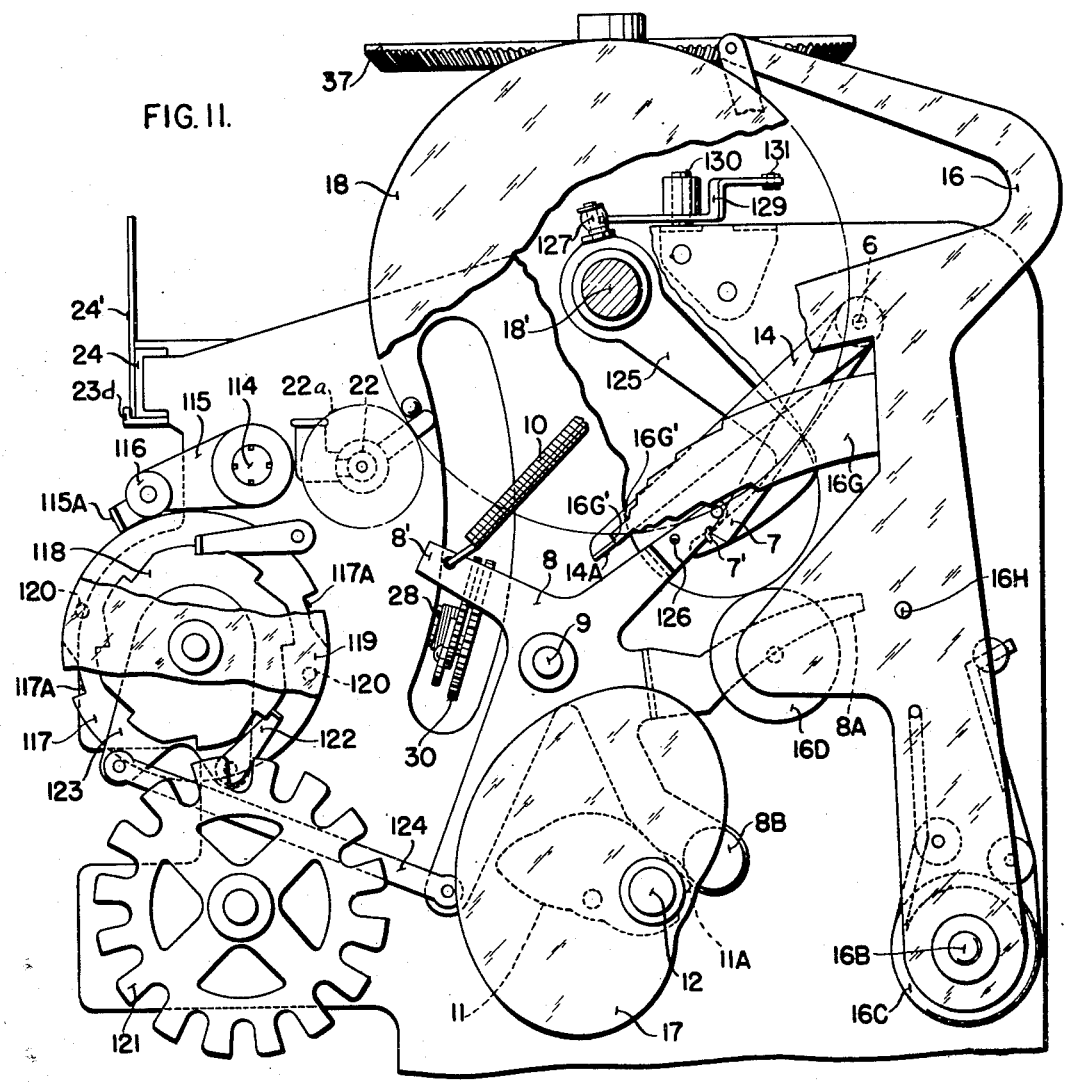
FIG. 11.
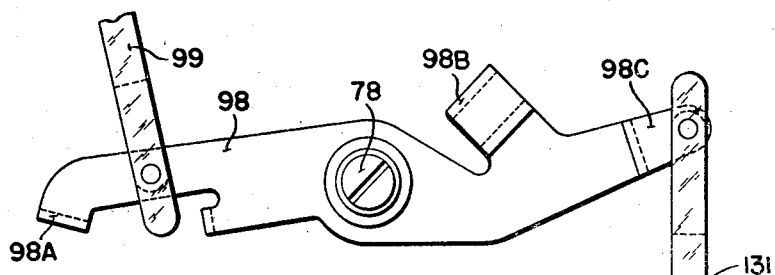
FIG. 12.
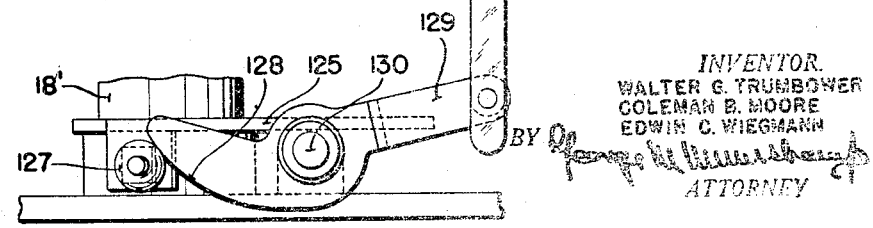
INVENTOR.
WALTER G. TRUMBOWER
COLEMAN B. MOORE
EDWIN C. WIEGMANN
BY
ATTORNEY Patented Apr. 6, 1943

2,315,682

UNITED STATES PATENT OFFICE 2,315,682

MEASURING INSTRUMENT

Edwin C. Wiegmann and Walter G. Trumbower, Philadelphia, and Coleman B. Moore, Carroll Park, Pa., assignors to The Brown Instrument Company, Philadelphia, Pa., a corporation of Pennsylvania Application December 2, 1938, Serial No. 244,152

5 Claims. (Cl. 171—95)

The present invention relates to potentiometric instruments and more particularly to a means for automatically recalibrating or standardizing such an instrument at suitable intervals to compensate for variations in the source of voltage which is used to energize the potentiometer.

More particularly it is an object of the invention to provide a mechanism which will utilize the automatic rebalancing mechanism of a potentiometer, after a suitable number of rebalancing operations, to periodically recalibrate the instrument to thereby maintain its readings at the highest possible accuracy. Provision is also made whereby the instrument may be standardized at any time between the regular standardizing periods.

The mechanism of our invention may be used with equal facility upon instruments that are adapted to record the value of a single variable or the values of a plurality of variables. In the latter case provision is made to prevent a recording operation from taking place during the recalibrating periods so that a false reading will not be obtained.

The mechanism of our invention may readily be placed either in new instruments or in instruments which are already in use by the mere substitution of one assembly for another and the addition of a drive lever or gear to the mechanism of the potentiometer, for the assembly.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

In the drawings:

Fig. 3 is a view of the right hand side plate with parts thereof broken away to move clearly and show the standardizing mechanism;

Fig. 4 is a view of the slide-wire assembly with the standardizing mechanism attached thereto;

Fig. 5 is a view taken on line 5—5 of Fig. 4, and Fig. 6;

Fig. 6 is a view taken on line 6—6 of Fig. 4 and Fig 5;

Fig. 7 is a top view of a modified form of standardizing mechanism;

Fig. 8 is a view looking from the right of Fig. 7;

Fig. 9 is a view of the standardizing mechanism and part of the slide-wire assembly looking from the left of Fig. 7;

Fig. 10 is a front view of the battery renewal indicating member;

Fig. 11 is a side view of a multiple record potentiometer showing a lock-out mechanism therefor operated by the standardizing mechanism; and Fig. 12 is a top view of certain linkage of Fig. 11.

Figure 2:
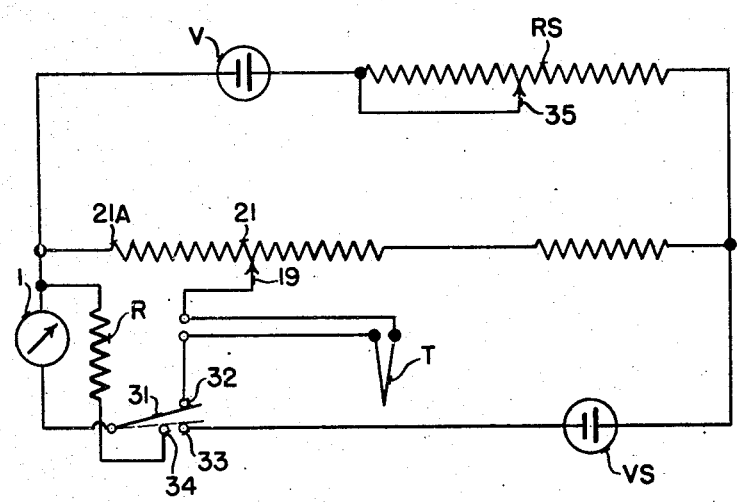
Fig. 2 is a circuit diagram of a typical potentiometer arrangement.

There is disclosed in Fig. 2 a typical potentiometer circuit in which the reference character V distinguishes a substantial constant source of electromotive force, usually a dry cell connected in series with an adjustable resistor RS that may be adjusted to vary the current flow in the circuit which also contains a slide-wire resistor 21. The normal use of the above described circuit is in measuring the electromotive force of an element such as the thermocouple T, the element being connected in series with a galvanometer I and the slide-wire 21 at a point along the length of the latter to oppose the battery V. The amount of the slide-wire 21 in the latter circuit is varied as may be necessary to bring the galvanometer pointer to zero.

In each operation of the instrument a contact 19, which is in series with the thermocouple T, is moved along the slide-wire 21 until the galvanometer pointer occupies its neutral position. In such a case the potential drop along the slide-wire 21 between point 21A and the contact 19, is equal and opposite to the potential drop between this point in the circuit including the battery V. When the voltage of the thermocouple exceeds or is less than the voltage drop across the resistance 21 between point 21A and contact 19 the galvanometer pointer is displaced from its neutral position and the contact 19 is shifted by the relay mechanism, to be later described, until the pointer resumes its neutral position.

While the electromotive force of the battery V is normally constant, its voltage ordinarily diminishes progressively throughout the work life of the cell. While a variation of the voltage source V does not prevent the rebalancing of the potentiometer, in practice an accurate measurement is only obtained by compensating for such voltage variations so as to maintain an approximately constant current flow through the potentiometer circuit. Such compensation may be effected by moving the contact 35 along the resistance RS to vary the amount of that resistance in the battery circuit. The adjustment of the contact 35 constitutes a recalibration of the potentiometer, with which the present invention is concerned.

The recalibration action automatically carried out with the instrument herein disclosed, involves a periodic adjustment of the switch lever 31 from a position in which it engages the contact 32, to insert the thermocouple T into the galvanometer circuit, to a position in which it engages contacts 33 and 34. In the latter position a source of standard volage VS is connected in series with the galvanometer to oppose the voltage drop of the source V across the slide-bar 21, at the same time a resistance R is shunted across the galvanometer. If the voltage of the source V is not equal to the source VS, the galvanometer will be deflected and the relay mechanism of this invention will be brought into action to shift contact 35 along the resistance RS until the galvanometer is again in its neutral position, with the voltage sources V and VS equal. After a predetermined number of rebalancing operations during which the contact 35 is being adjusted to its proper position the switch arm 31 will again be automatically moved into engagement with contact 32 to reinstate thermocouple T in series with the galvanometer.

Figure 1:
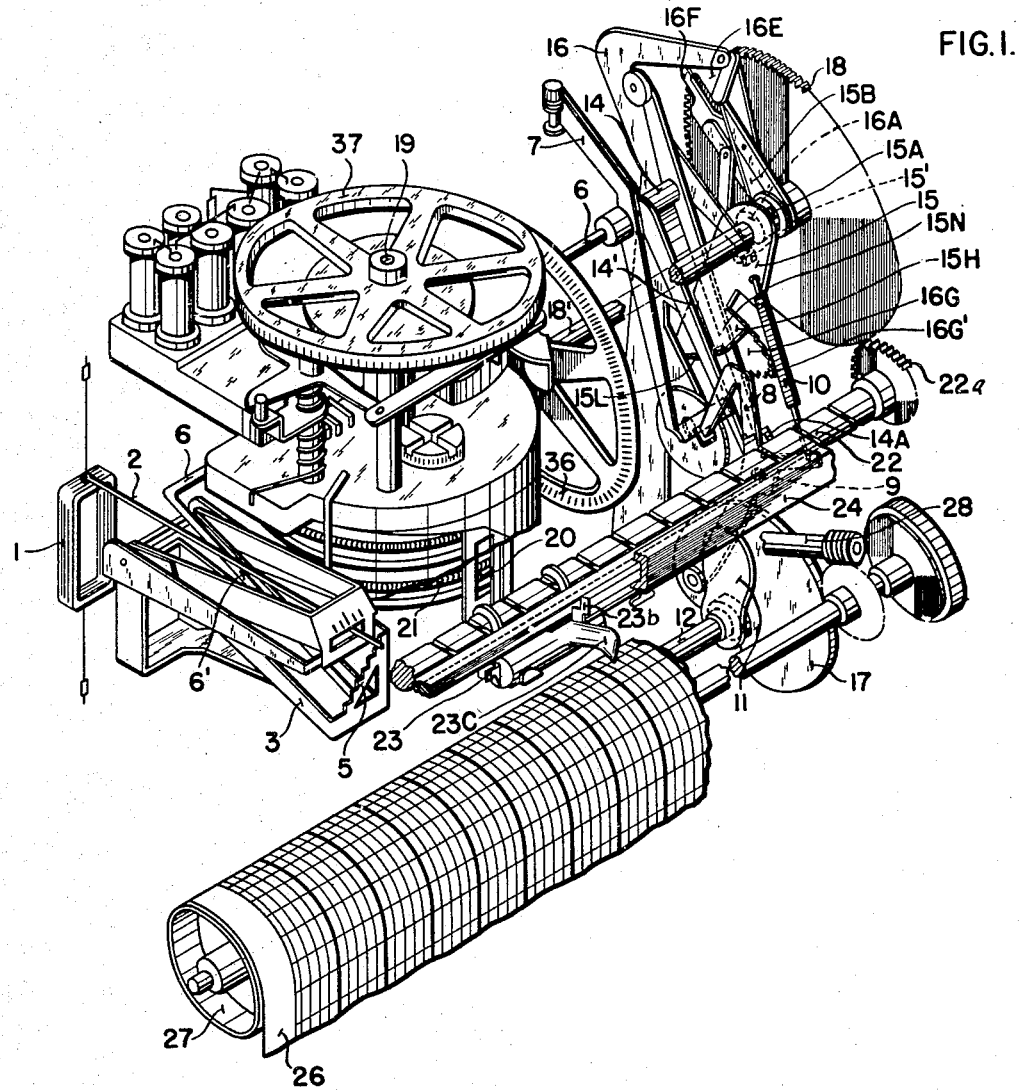
Fig. 1 is a perspective view of the essential parts of a potentiometer instrument.

The recording potentiometer instrument shown in perspective in Fig. 1, and significant operative parts of which are illustrated in Fig. 1, includes a galvanometer 1, the pointer 2 of which deflects in response to a condition of unbalance in the potentiometer measuring circuit, which may be any well-known form including the resistance 21 which may be adjusted to rebalance the potentiometer. The instrument also comprises mechanical relay provisions operated by a constantly rotating driving motor (not shown) and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, we make use of certain instrumentalities to be later disclosed.

The mechanism of the instrument of Fig. 1 through which the deflection of the galvanometer pointer 2 controls the adjustments of the recorder carriage 23 and the rebalance of the potentiometer circuit on a variation in the quantity or value measured by the galvanometer comprises a pointer engaging and position gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2. The element 3 is engaged by, and turns with the arm 6' of a rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7, thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15 engages the bottom wall of a slot 14' in the member 14, and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of the projection 16A carried by a ratchet lever 16 pivoted at 16B.

A spring 16C gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupied when the galvanometer pointer 2 is in its neutral position.

The position assumed by the part 15, when in locking engagement with the secondary pointer 14, controls the action of the pawls 16E and 16F by virtue of the fact that the collar or hub portion 15A of the part 15 carries a spring pawl engaging arm 15B. The movement of the locking part 15 into position in which its shoulder 15H engages the secondary pointer 14 causes the arm 15B to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15B shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14A of the secondary pointer 14, and thereby arrest the forward movement of the ratchet lever 16. In the neutral position of the galvanometer pointer and secondary pointer 14, the projection 14A of the latter engages the central shoulder 16G' of the arm 16G and the lever 16 is then held against any operative movement in the clockwise direction. When the secondary pointer position is more or less to one side or the other of its neutral position, the portion 14A engages an upper or lower shoulder on arm 16G more or less distant from the central shoulder 16G', and the lever 16 is then permitted more or less forward movement.

The rotation of the wheel 18 in one direction or the other effects corresponding potentiometer rebalancing adjustments and position adjustments of the recorder carrier 23 upon which is mounted a marker 23C to engage a chart. The rebalancing adjustments are affected by means of a rheostat shaft 19 which is geared to the shaft 18', by gears 36 and 37, on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear 22a carried by a carriage adjusting shaft 22 which is formed with a thread groove of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion transverse to and through which the shaft 22 extends, two projections 23b, one at each front corner of said body portion which bear against the inner edge and upper side of the lower flange of a channel bar or rail 24 forming part of the instrument framework. In addition, the body portion of the carriage frame is provided with a forwardly extending tongue passing beneath the rail 24 and terminating in an uprising pointer or index 23d (see Fig. 3) adapted to cooperate with a scale 24' fastened to the front face of the rail 24 to indicate the position of the pen carriage and the value of the quantity measured and recorded by the instrument.

The record sheet 26 passes over and is given feeding or advancing movements by a record feed-roll 27. The latter is intermittently rotated by means of a worm and screw connection between the shaft of the roll 27 and a transverse shaft 28. Shaft 28 is intermittently actuated by means of a ratchet and lever device 30 which is engaged and oscillated by the arm 8' of the rocker 8 on each oscillation of the latter.

The shaft 19 forms part of the rebalancing mechanism and is journaled in a part 38 that may be formed of some insulating moulded material which is formed with a helical groove on its outer surface to support the slide-wire resistance 21. A cylindrical extension on the part 38 at its lower end is formed with circular grooves to support the recalibrating resistance RS. The part 38 may be enclosed in a glass or other suitable casing 39 to protect it from dirt and corrosive fumes. As more clearly shown in Figs. 4 and 6 the shaft 19 has attached to its upper end the gear 37 and to its lower end a laterally extending arm 40 that supports a bracket 41 in which the contact 20 is adapted to move in engagement with the slide-wire 21. The arrangement is such that as the shaft 19 is rotated the contact 20 will be raised and lowered as it travels in a helical groove formed by the resistance 21 and a cooperating conductor 42.

Surrounding the shaft 19 and acting as a journal therefor is a tubular shaft 43 that has attached to its upper end a driving gear 44 and attached to its lower end an angular bracket 45 which supports the contact 35 for movement around the resistance RS. The shaft 43 is journaled at its upper and lower end in a bushing 46 that may be moulded in the part 38. The gear 44 is periodically rotated to change the position of contact 35 along the resistance RS and thereby recalibrate the instrument, by the potentiometer rebalancing mechanism. The manner in which this is accomplished will now be described.

Rotatably mounted on bushing 46 is a collar 47 which has attached to it a lever 48 that is generally U shaped in form and is provided at its outer end with a socket 49. The socket receives a ball 50 on the upper end of a lever 51 that is journaled for oscillation on the shaft 18'. The lower end of lever 51 is provided with an opening 52 that receives a roller 53 carried by one end of the lever 8. Therefore, upon each cycle of the instrument rebalancing mechanism the lever 51 is oscillated around shaft 18' to oscillate the lever 48 around bushing 45 by means of the ball and socket joint 49, 50.

The lever 48 has pivotally mounted on it a pawl 55 which is biased in a counter clockwise direction in Fig. 5, by a spring 56, into engagement with a large ratchet 57, the ratchet being journaled for rotation on bushing 45. The ratchet 57 is rotated one tooth for each cycle of the instrument and is provided with one deep tooth 58 so that once each revolution thereof the pawl 55 can engage a tooth in a small ratchet 59 which is rotatable on the bushing 45 above the ratchet 57. The ratchet 59 is therefore rotated for a distance of one tooth upon each revolution of the ratchet 57. Holding pawls 60 and 61 are pivoted at 62 on the part 38 and biased toward ratchets 57 and 59 respectively by a spring 63.

Attached to the ratchet 57 is a cam 64 having a low portion 64A that has an arc of a distance approximately equal to six ratchet teeth and attached to the ratchet 59 is a disc 65 having a cutout portion 65A. Bearing on the edge of cam 64 is a roller 66 that is mounted near the end of a lever 67 which has an upturned edge 68 bearing on the edge of disc 65. The lever 67 is pivoted at 69 and is biased in a clockwise direction around its pivot by a spring 70 to keep the roller 66 and edge 68 in engagement with the cam and disc respectively.

Also pivoted at 69, above the lever 67 is a second lever 71 that is resiliently held by a spring 72 so that an extension 71A thereof is in engagement with a projection 67A in the form of an eccentric screw on the lever 67. One end of the lever 71 carries a pair of gears 73 and 74 that are rotatable together and that are adapted to engage respectively with gear 75 attached to shaft 19 and the gear 44 on the tubular shaft 43. Attached to the other end of the lever 71 is a link 76 which connects for movement with the lever 71 a third lever 77 that is pivoted at 78. This lever 77 has a turned down portion 77A on one end to act as a handle and a turned up portion 77B on the other end which normally bears against the gear 44 to prevent accidental movement thereof. The pivot 78 is a stub shaft which extends through a switch housing 79 on the part 38 and has attached to it the switch arm 31 as well as lever 77.

In the normal operation of the device the parts are positioned as in Fig. 5 with the switch arm 31 in engagement with contact 32, the arm 71A in engagement with eccentric screw 67A and the gears 73 and 74 out of mesh with gears 75 and 44 respectively. During the normal operation of the instrument the relay mechanism is measuring the deflection of the galvanometer pointer and adjusting the pen carriage along the chart to make a record of the value of the condition to which the thermocouple T is responsive. Upon each cycle of the instrument the lever 8 moves the lever 48 to rotate ratchet 57 a distance of one tooth. Once during each revolution of ratchet 57 the deep tooth 58 thereof comes under pawl 55 and the ratchet 59 is thereby rotated for a distance of one tooth.

The rotation of ratchet 59 eventually brings the cut-out portion 65A of the disc 65 under edge 68 of lever 67 as shown in Fig. 5. Thereafter during the rotation of cam 64 its low portion 64A will come under roller 66 and permit that roller and its supporting lever 67 to move clockwise in Fig. 5 under the bias of spring 70. As lever 67 moves it will move the lever 71 to bring gears 73 and 74 into mesh with gears 75 and 44 respectively, and at the same time, through link 76, move lever 77 clockwise to release the brake 77B from gear 44. This same movement rotates shaft 78 and switch arm 31 to bring the switch arm into engagement with contacts 33 and 34.

The standard cell VS is now connected across the slide-wire 21, through the galvanometer 1, in opposition to the dry cell V. Thereafter, if the voltage of the dry cell has decreased, the galvanometer will be deflected in accordance with such decrease. The relay mechanism will rotate the gear 37 in accordance with the galvanometer deflection and through the gear train 37, 75, 73, 74 and 44 rotate the tubular shaft 43 to move contact 35 along the standardizing resistance RS in a direction to compensate for the decrease in voltage of the dry cell V. The low portion of cam 64 extends for an arc equal to about six teeth on the ratchet 57, so that the instrument will be standardizing itself for a length of time equal to six of its cycles before the cam 64 moves roller 66 clockwise to disengage gears 73 and 74 from the gears 75 and 44 and move switch arm 31 back into engagement with contact 32. During the next revolution of ratchet 57 the deep tooth 58 will come under pawl 55 so that the ratchet 59 can be moved and take cut-out portion 65A of disc 65 out from under edge 68. The number of teeth in each ratchet is computed with respect to the time of the instrument cycle so that the automatic standardizing takes place approximately every thirty minutes.

Provision is also made in the above mechanism to standardize the potentiometer at any time by manually moving the gears 73 and 74. This is accomplished by pressing the part 77A to the left in Fig. 4. Such movement shifts switch arm 31 into engagement with contacts 33 and 34 and at the same time, through link 76, moves lever 71 around its pivot against the tension of spring 72 to mesh gears 73 and 75 and gears 74 and 44. The instrument will thereafter standardize itself in the above described manner until such time as lever 77 is returned to its normal position. It is noted that the brake member 77B is used to prevent accidental movement of the gear 44 and therefore accidental movement of the contact 35 along the resistance RS.

There is shown in Figs. 7-10 another embodiment of our invention that differs mainly from the one previously described in that the cam mechanism which determines the time between the standardizing periods is driven at a constant speed through a reduction gear from the main motor drive shaft instead of by a ratchet mechanism from the rebalancing mechanism.

As is shown in Fig. 7 the constantly rotating motor shaft 12 is provided with a worm 80 that meshes with a worm wheel 81 fastened to a vertical shaft 82. This shaft extends through a bushing, 82A on the part 38 and is provided on its top with a pinion 83 that meshes with the larger of two gears 84 and 85 that are journaled for rotation on a bushing 86 which is also mounted on part 38. The gears 84 and 85 mesh respectively with gears 87 and 88 that are mounted for rotation around the bushing 46, as were the ratchets 57 and 59 of the previously described embodiment, and therefore the latter gears are rotated at different speeds. Attached to the gear 87 is a large cam 89 having a cut-out portion 89A and attached to the gear 88 is a smaller cam 90 having a cut-out portion 90A. These cams, when their cut-out portions have a definite relation to each other, serve to permit the recalibrating or standardizing operation to take place in a manner presently to be described.

The tubular shaft 43 that moves the contact 35 along the resistance RS is, in this case, provided at its upper end with a gear 91 that meshes with a gear 92 which is mounted for rotation around a shaft 93. Attached to the gear 92 is a gear 94 that meshes with a third gear 95 rotatable around a stud shaft on the end of a lever 96, which lever is also pivoted on the shaft 93. The gear 95 is adapted to mesh with a gear 97 on the shaft 19 so that when the two are in mesh the gear 91 will be driven upon rotation of shaft 19, to adjust the contact 35. The lever 96 may be moved to engage gears 95 and 97 by pushing the turned down end 98A of lever 98 to the left in Fig. 9 or upward in Fig. 7. Movement is transferred from the lever 98 to lever 96 through a link 99 and against the bias of a spring 100 that normally holds the lever 92 in the position shown in Fig. 7 with its edge in engagement with an eccentric pin 101. Movement of the lever 98 also turns the shaft 78 to shift contact arm 31 from engagement with contact 32 into engagement with contacts 33 and 34 to connect the standard cell VS in circuit with the galvanometer and removes a brake 98B from the gear 91.

The lever 96 is automatically shifted to mesh gears 95 and 97 by a lever 102 upon which the pin 101 is mounted. This lever 102 is also pivoted on shaft 93 and is biased in a clockwise direction or meshing direction in Fig. 7, by a spring 103 so that its end 104 normally bears on the cam 90 and a roller 105 on it normally bears on the cam 89. When the cams 89 and 90 rotating at different speeds, are in such relative positions that their low portions are respectively under the roller 105 and end 104 the lever 102 is moved by the spring 103 to bring the gears 95 and 97 into engagement and perform the recalibrating operation.

The operation of this embodiment of the invention is very similar to that of the embodiment disclosed in Figs. 4-6. The gear 83, driven at a constant speed from the motor shaft 12, drives the gears 87 and 88 and their respective cams 89 and 90 at slightly different rates. When, during their rotation, the low portions of the cams 89 and 90 come under roller 105 and end 104 of the lever 102, that lever will be moved clockwise in Fig. 7 by the spring 103 and, through pin 101 and lever 96, will bring gears 95 and 97 into mesh. This same movement will, through the link 94, move the lever 98 to release a brake from gear 91 and connect the standard cell VS in the galvanometer circuit and across the slide-wire 21 to oppose the battery V. If the voltages of battery V and standard cell VS are not the same the galvanometer will be deflected and the relay mechanism will rotate gear 37 in response thereto. Rotation of gear 37 will, through the gear train 97, 95, 94, 92 and 91, rotate the shaft 43 and contact 35 to a position along resistance RS until the values of battery V and standard cell VS are equal. The low portions 89A and 90A of the cams are so dimensioned with respect to their speed that enough cycles of the relay mechanism can take place to recalibrate the circuit before the edge of 89A comes under roller 105 to move the levers 102 and 96 back to their normal positions of Fig. 7.

The instrument can be recalibrated at any time by manually moving the lever 98 clockwise in Fig. 7 and thereby throwing the switch 31 and moving gears 95 and 97 into mesh.

It is often desirable to have some indication of the value of battery V so that the instrument attendant may be notified when it is necessary to replace the battery with a new one. To this end the gear 91 is provided with a downwardly projecting pin 106 that is so angularly positioned on the gear with respect to the contact 35 on arm 45 that the position of the pin is an indication of the position of the contact. The position of this pin is then used to set an indicating member. Pivotally mounted on a bushing 107 projecting from the upper surface of part 38 is a lever 108 which has one end in the path of pin 106 and attached to its other end one end of a link 109. The other end of link 109 is pivoted to the upper end of a crank member 110 that is attached to a shaft 111 which is suitably journaled in a side plate of the instrument. The front end of shaft 111, as is best shown in Fig. 10, has attached to it a pointer 112 that moves across a suitable scale 113 fastened to the front of the scale 24'.

In operation, as the gear 91 turns counter-clockwise in Fig. 7, due to adjustments made to the contact arm 45 the pin 106 will engage lever 108 and rotate it around its pivot. This moves the pointer 112 across scale 113 and at the time the voltage of battery V has decreased to a point where renewal is necessary the end of pointer 112 is over the mark on the scale. It is of course, obvious that an indicator of this type could also be used in connection with the embodiment shown in Figs. 4-6 if desired. To do this it would only be necessary to attach a pin 106 to the gear 44. Such a construction has not been shown in the first embodiment solely for the sake of clearness.

When an automatic standardizing or recalibrating mechanism is used on a multiple potentiometer instrument, or one with which records are made of the values of a plurality of conditions, it is necessary to provide some means which will prevent a printing operation from taking place during the recalibrating periods. The reason for this is because in most multiple instruments the printing and switching operations, the latter of which connects the instrument to another thermocouple, take place either periodically, or after the instrument has reached a balance condition. Therefore, if the standardizing period should be taking place when a printing operation occurred an incorrect value would be recorded for the condition that was being measured prior to the start of the standardizing period, and the switching operation would take place before a true record could be made.

There is shown in Fig. 11 the side plate of a multiple potentiometer with various of the parts removed to move clearly and show a hold-out means for the printing mechanism. The rebalancing relay may take the form of that previously described in this application and the printing mechanism may well be of the type shown and described in the application of Coleman B. Moore, Serial Number 224,826 to which no claim is made herein. Enough of the printing mechanism will be described to clearly demonstrate how the mechanism herein may be used to prevent a printing operation from taking place during a standardizing period.

The printing mechanism may consist of any desired type of print hammer or print wheel, but is preferably of the type disclosed in the above mentioned application 224,826 and is mounted on a splined shaft 114 for sliding movement transversely of the instrument. The print wheel is moved to a position above the chart corresponding to the value of the condition being measured by the threaded shaft 22 which is driven through gears 22A and 18 in a manner already described. The printing operation takes place periodically as the instrument reaches a balanced condition.

In order to perform the printing operation a lever 115 is fastened to the splined shaft 114 and is biased counterclockwise to bring its roller 116 and edge 115A into engagement with the periphered surface of a cam 117 having cut-out portions 117A. This cam is intermittently rotated by a ratchet wheel 118 to bring its cut-out portions below the edge 115A so that the lever 115 may turn counter-clockwise and rotate shaft 114 to perform the printing operation. Attached to the cam 117 for rotation therewith is a disc 119 and between the disc and cam extends a pair of pins 120 that are so positioned with respect to the portions 117A that immediately after one of the portions 117A comes under edge 115A to permit a printing operation a pin engages a tooth of the wheel 121 to rotate that wheel for a distance of one tooth. Rotation of wheel 121 is used to switch another thermocouple into the galvanometer circuit and to bring another printing character into printing relation to the chart, all as set forth in the above mentioned application 224,826.

The ratchet 118 is periodically rotated by a pawl 122 carried on a pawl plate 123 that oscillates around shaft 118A upon which the cam, ratchet and disc are mounted. The pawl plate 123 is oscillated by a link 124 attached at one end thereto, and at its other end to an arm of the lever 8. The arrangement is such that when the instrument is almost in balance the pawl 122 will rotate ratchet 118 to bring the cam 117 to printing position, but when the instrument is further from balance as when it has just been switched to a thermocouple, the pawl will not be effective to move the ratchet. This is accomplished in the following manner.

As has been previously described the position of edge 14A with respect to the steps on the arm 16G determines the movement of gear 18 and the threaded shaft 22 to position the pen carriage properly above the chart. When the instrument is far enough out of balance for the projection 14A to engage one of the shoulders of arm 16G beyond the shoulders 16J, a pin 16H will be in the path of an arm 8A formed on the lever 8 to prevent that lever from moving the full length of its clockwise stroke as determined by engagement of its roller 8B and the cut-out portion 11A on cam 11. This limiting of the stroke of lever 8 prevents the plate 123 from moving clockwise enough for pawl 122 to engage the next tooth on ratchet 118. When, however, the instrument is near enough in balance for edge 14A to engage the shoulders 16J of the arm 16G the lever 16 will be prevented from moving counter-clockwise far enough for the pin 16H to be under arm 8A. Therefore, during the subsequent cycles of the instrument lever 8 can move its full stroke and pawl 122 will move ratchet 118. The instrument is so designed that after edge 14A engages shoulder 16J it will be in balance within four cycles, therefore the ratchet 118 is provided with eight teeth and cam 117 is provided with two cut-out portions 117A so that two printing and switching operations occur for each complete revolution thereof.

It is, of course, obvious that more teeth could be formed on the ratchet if desired or that the pin 16H could be omitted so that the ratchet is rotated on each cycle of the instrument. In the latter case it would be best to use only one cut-out portion 117A and one pin 120 in order that the instrument would be given a longer time between each printing operation. The specific manner in which the printing is accomplished is not material in the present application except insofar as there is provided some means to prevent a printing operation from taking place during recalibrating periods.

Since the recalibrating periods are determined by cams 64 and 65 or by cams 89 and 90 independently of the printing cycles or the nearness of the instrument to balance, successive recalibrating would normally cause a printing operation to occur. To prevent this an L shaped lever 125 pivoted on shaft 18', is moved under a pin 126 on lever 8 during each recalibrating period. This arm prevents lever 8 from making its complete clockwise stroke and thereby prevents the pawl 122 from engaging the next tooth on the ratchet 118 so that the cam 117 and wheel 121 will not be moved. The lever 125 is biased by gravity and/or a spring in a clockwise, locking direction, but is normally held in its counter-clockwise position, as shown in Fig. 11, by engagement between a roller 127 on its upper end and a cam 128. The cam 128 forms part of a lever 129 which is pivoted at 130 on a bracket attached to the side plate and connected at its other end to an extension 98C of lever 98 (as shown in Fig. 12), or lever 77, by a link 131.

In its operation, as the lever 98 is moved clockwise in Fig. 12 to initiate a recalibrating period the lever 129 will also be moved clockwise to permit its cam edge 128 to recede relative to the roller 127. The lever 125 may therefore move clockwise in Fig. 11 until its hooked end is in the path of pin 126 on the lever 8. Thereafter while the instrument is being recalibrated the roller 8B on lever 8 is unable to enter the cut-out portion 11A of cam 11 and therefore the lever 8 can not move far enough for pawl 122 to rotate ratchet 118. Consequently no printing or switching operation may take place while the instrument is being recalibrated.

From the above description it will be seen that we have provided a standardizing or recalibrating mechanism that is simple and positive in its operation. The entire unit may be supplied to an instrument not so equipped by merely removing its present slide-wire assembly and substituting therefor an assembly similar to either of those above described. The only change then necessary to the instrument is the addition thereto of a device for actuating the standardizing mechanism, and this is easily installed.

The mechanism of our invention is versatile enough for any use inasmuch as it may either be operated automatically, or manually by moving the lever 77 or lever 98 in the proper direction. By providing an indicator for the battery condition the attendant is warned in advance of the need for a new battery and by providing a lock-out arm for use on multiple instruments only accurate recorders are made.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a self-balancing measuring instrument of the type wherein there is provided a measuring circuit having a recalibrating resistance and means to adjust the same, the combination of a first rotating ratchet, a first cam rotatable therewith, a second rotating ratchet, a second cam rotatable therewith, means to rotate said ratchets, a first gear to drive the adjusting means, a mechanical relay, a second gear driven by said mechanical relay, and means responsive to the angular position of said cams to connect said second gear in driving relation with the first.

2. In a self-balancing measuring instrument, a deflecting element, a pair of relatively movable members, cyclically operating means to adapted to relatively adjust said members in accordance with deflection of said element, ratchet means operated by said cyclic means and means controlled by said ratchet means to connect said cyclically operating means to said relatively moving members to relatively adjust said members by said cyclically operating means.

3. In a self-balancing measuring instrument of the type wherein there is provided a measuring circuit having a source of potential, a measuring resistance, a recalibrating resistance and a galvanometer with a deflecting element, the combination with said element of periodically operated means to effect adjustments of the measuring resistance depending upon deflection of said element from a normal position, a member tending to move from an inactive position to a position in which it will initiate adjustment of the recalibrating resistance by said periodically operated means, means to maintain said member in its inactive position comprising a pair of cam followers on said member, a pair of cams upon which said followers are adapted to bear respectively and intermittently operated means to rotate said cams at different rates.

4. In a measuring instrument, the combination of a pair of resistances, means to adjust one resistance including a gear, intermittently operated means to rotate said gear, means to adjust the second of said resistances at periodic intervals including a second gear, means to drive said second gear from the first including a pair of idler gears mounted for rotation together and adapted to be moved into mesh with said first two gears, cam means rotated by said intermittently operated means, and mechanism controlled by said cam means to regulate movement of said idler gears into and out of mesh with said first two gears.

5. In a self-balancing measuring instrument, the combination of a deflecting element, means to apply a first force to deflect said element, mechanical relay means to return said element to a neutral position in response to a deflection thereof, means to apply a second force to cause a deflection of said element, means to alternately connect said force applying means to said element, ratchet means to operate said last mentioned means, said ratchet means in turn being operated by said mechanical relay, cams connected to and rotatable with said ratchet means, means to adjust said element operated by said mechanical relay in response to connection to said element of said second force applying means, said cams operating to control the time said second force is applied to said element.

WALTER G. TRUMBOWER.
EDWIN C. WIEGMANN.
COLEMAN B. MOORE.

CERTIFICATE OF CORRECTION.

Patent No. 2,315,682.   April 6, 1943.

EDWIN C. WIEGMANN, ET AL.

It is hereby certified that error appears in the printed specification of the above numbered patent requiring correction as follows: Page 7, first column, line 5, claim 2, after the word "means" strike out "to"; and line 9, claim 2, after "means to" insert --periodically--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.